United States Patent [19]
Goertzel et al.

[11] Patent Number: 6,141,696
[45] Date of Patent: *Oct. 31, 2000

[54] SECURE DECENTRALIZED OBJECT EXPORTER

[75] Inventors: Mario C. Goertzel, Kirkland; Alexander A. Mitchell, Redmond; Richard D. Hill, Bellevue, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/790,655

[22] Filed: Jan. 29, 1997

[51] Int. Cl.$^7$ ................................ G06F 9/00; G06F 9/46; G06F 15/163

[52] U.S. Cl. .............................................. 709/310

[58] Field of Search ..................... 395/680–685; 709/300–305, 310–322

[56] References Cited

PUBLICATIONS

Joint submission on interoperability between Microsoft component object model and OMG common object request broker 2.0, Aug. 1994.

Brown et al, "Distributed component object model protocol", Nov. 1996.

Component Object Model Specification, Chapter 13, pp. 163–190, Mar. 1995.

*Primary Examiner*—Majid A. Banankhah
*Assistant Examiner*—P. Caldwell
*Attorney, Agent, or Firm*—Michalik & Wylie, PLLC

[57] ABSTRACT

A method and system for preventing incorrect information from corrupting server object information maintained by a client machine. A DCOM client machine is provided with object reference information for accessing remote objects. DCOM unmarshals the information into server object information, including an object identifier and string bindings of a remote resolver through which the client machine may contact the remote server to obtain string bindings for that remote object. Each resolver string bindings received by a client machine are compared against known resolver string bindings and each unique permutation of string bindings is associated with a unique machine identifier locally generated therefor. Each object identifier is paired with its corresponding unique machine identifier so that all references to a remote object include the identity of the machine on which the object was created.

17 Claims, 5 Drawing Sheets

RESOLVER TABLES

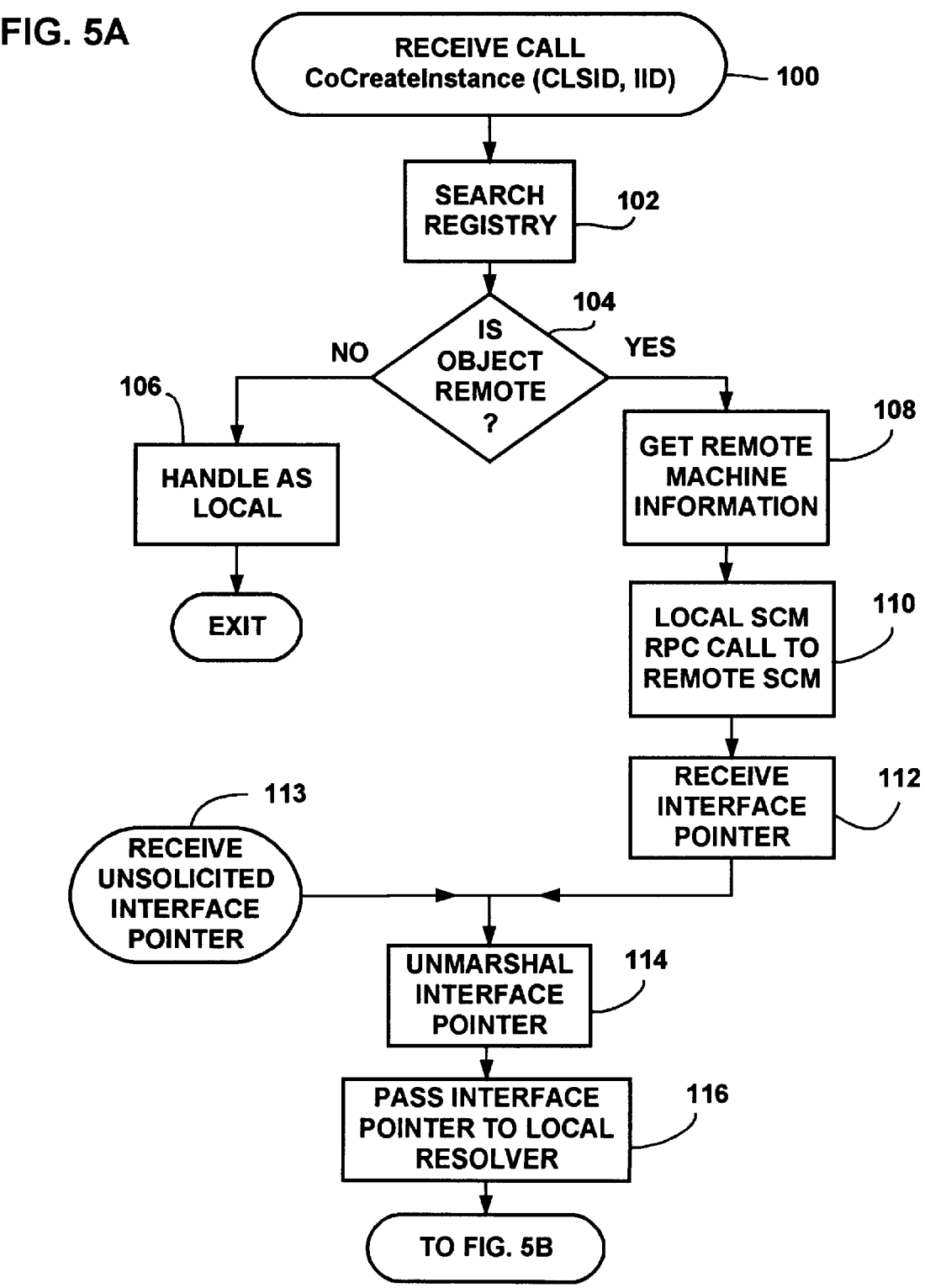

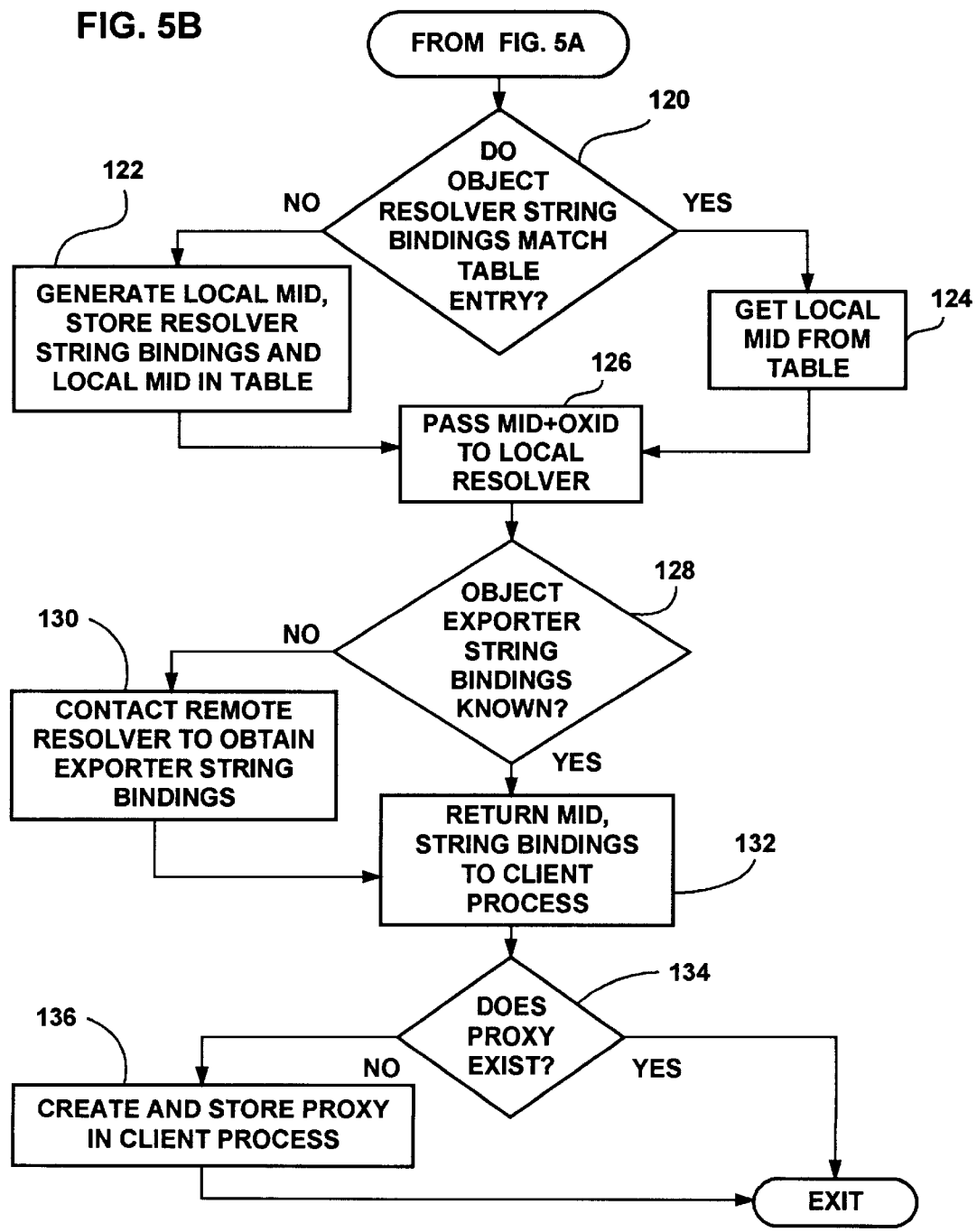

SECURE DECENTRALIZED OBJECT EXPORTER

FIELD OF THE INVENTION

The invention relates generally to distributed computer systems, and more particularly to a method and mechanism for preventing incorrect information from corrupting server object information maintained by a client machine.

BACKGROUND OF THE INVENTION

In distributed computer systems using the Distributed Component Object Model (DCOM) protocol, objects are distributed among various networked machines and are accessed via remote procedure calls (RPC). In DCOM, each computer that exports objects contains an object exporter providing client machines with information about objects residing on that machine. Some of the reference information that a client needs in order to access a remote object includes an interface identifier and an object identifier of the remote object, and the string bindings of the object. As is known, the string bindings identify a particular process on a particular machine such as a server process in which a remote object is implemented, along with the a network protocol to communicate with the machine.

One way in which DCOM obtains the reference information for a remote object is when a client application process asks for an object to be created, and, although the details are hidden from the client by DCOM, the object is created on a remote machine rather than locally. Reference information is returned by the remote machine as part of the activation process. The local client machine's DCOM routines unmarshal the returned reference information and store the information in tables of the client process and a local resolver process so that the requesting client process and other client processes can contact that remote object (via a proxy object). For efficiency reasons, the reference information does not directly contain the string bindings of the remote object, but instead contains the string bindings of the remote machine's resolver. If the string bindings for the remote object are not already known to the client machine, DCOM securely contacts the remote resolver via its local resolver to obtain the string bindings for that object so that the client process (via a proxy object) can access the remote object.

Another way in which DCOM obtains reference information for a remote object is when a remote process gives a client application an object reference. The client machine's DCOM likewise unmarshals this reference information and stores it in the client process and local resolver tables for use by client processes. Although this reference information is unsolicited, receiving reference information in this manner is desirable in that certain client processes may wish to access objects identified by such unsolicited references without having to undergo the expense of obtaining the object information. For example, at a certain time of day a database may send a reference to an object that a timed application uses shortly thereafter.

However, an unsolicited reference may contain bad information which can corrupt the tables maintained by the local resolver. More particularly, a client machine's resolver tables can be filled with information for a given object such that the wrong remote resolver may be contacted by the client machine's resolver during the attempt to obtain the remote object's string bindings. For example, a malicious machine can corrupt a table by sending the same object identifier (and similar reference information) as another object entry but with the string bindings of a different resolver. When a client machine attempts to use that object identifier, such as to look up the string bindings of the remote resolver for the purpose of obtaining the remote object's string bindings, two or more conflicting entries will exist with that object ID. The client machine may call the malicious machine's object exporter and thus get the string bindings to an unknown object. A centralized authority could maintain the table and thus eliminate conflicts, but will become overwhelmed with a large number of machines and thus is not a desirable solution for the DCOM framework.

OBJECTS AND SUMMARY OF THE INVENTION

Accordingly, it is a general objective of the present invention to provide a method and mechanism that prevents incorrect information from corrupting server object information maintained by a client machine.

A related objective is to ensure that client processes that create instances of remote objects communicate with those remote objects on the correct machines.

Another objective is to provide a method and mechanism as characterized above that operates in each machine without the need for a centralized authority.

Yet another objective is to provide the above method and mechanism while still allowing unsolicited object information to be received.

Another objective is to provide a mechanism and method of the above kind that is integrated into DCOM.

Briefly, the present invention provides a method of preventing object information received at the client machine from one remote machine from corrupting object information stored for another remote machine. Object reference information including identifier information for a remote object and the string bindings of a resolver process is received from a remote machine. The string bindings of the resolver process are compared to a table of stored string bindings, and if the string bindings of the resolver process do not match an entry in the table, a unique machine identifier is generated. The unique machine identifier is associated with the string bindings of the resolver process, and using the string bindings of the resolver process, the string bindings of the remote object are obtained. The identifier information for the remote object is paired with the unique machine identifier, and the remote object is referenced by the pairing of the identifier information for the remote object with the unique machine identifier. For example, a distinct proxy is provided for each distinct pairing.

Other objects and advantages will become apparent from the following detailed description when taken in conjunction with the drawings, in which:

BRIEF DESCRIPTION OF THE DRAWINGS

FIGS. 5A and 5B comprise a flow diagram representing the steps taken to prevent corruption of the tables of FIG. 4.

DETAILED DESCRIPTION OF THE PREFERRED EMBODIMENT

Figure 1:
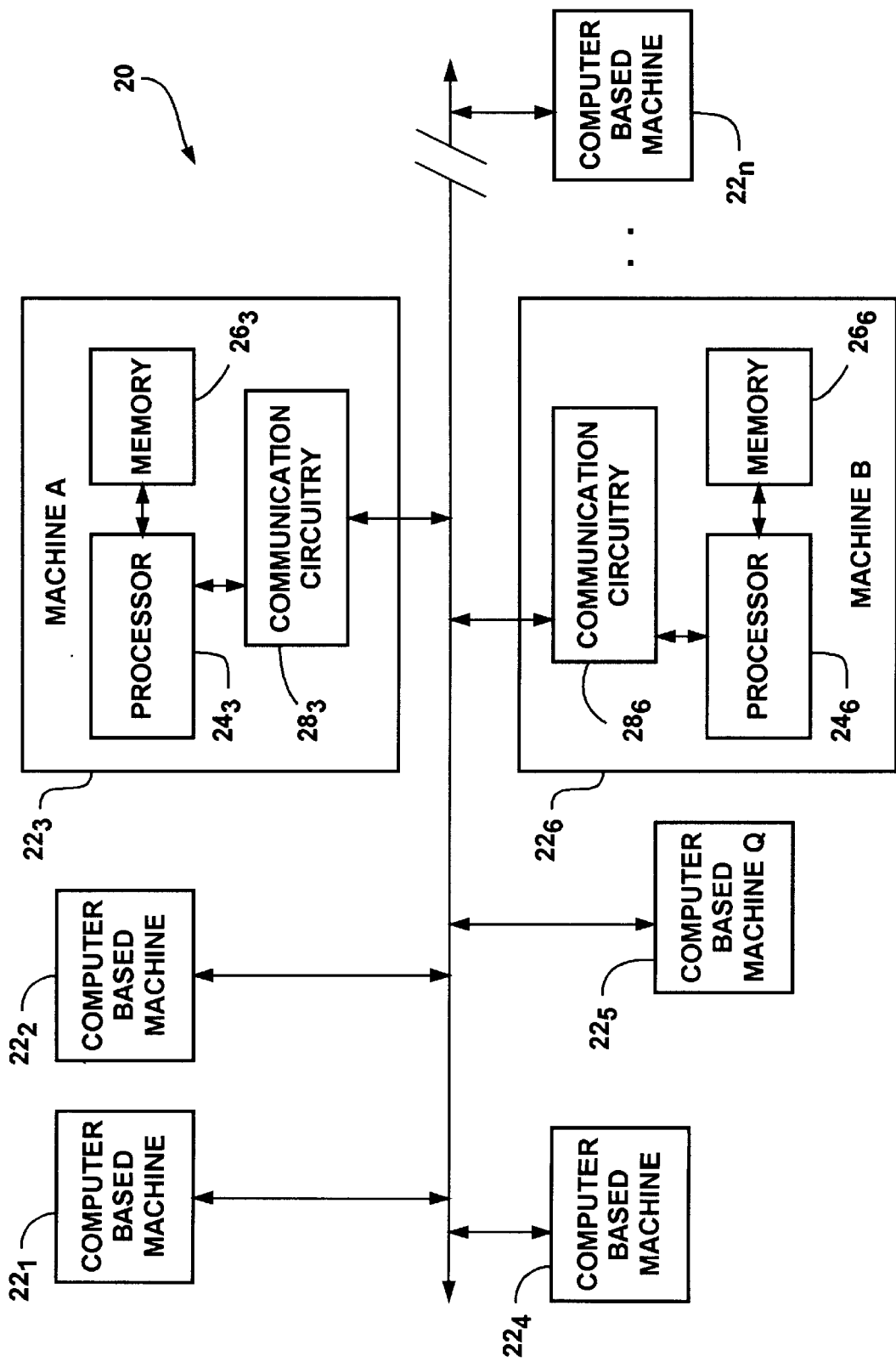
FIG. 1 is a block diagram representing a computer network into which the present invention may be incorporated.

Turning to the drawings and referring first to FIG. 1, there is shown a computer network generally designated 20 into which the present invention may be incorporated. The computer network 20 comprises a number of computer-based machines $22_1$–$22_n$ interconnected in known manner. The machines $22_1$–$22_n$ communicate with one another by passing data packets via remote procedure calls, and are arranged to recognize many different protocols at the network and transport layers. As shown in FIG. 1, any of the machines $22_1$–$22_n$ may act as client workstations or servers, or both, although it can be appreciated that in a particular network certain of the machines may be limited so as to act only as clients, while still other machines may be printers or the like.

In any event, the exemplified machines $22_1$–$22_n$ of FIG. 1 use the distributed component object model (DCOM) presentation-level protocol, which provides a framework that facilitates communication between object-oriented client processes and object-oriented server processes of a local/remote machine through remote procedure calls (RPC). The DCOM protocol consists of a set of extensions, layered on the distributed computing environment (DCE).

Each of the machines such as the machines 223 and 226 of FIG. 1 includes a processor 24, a memory 26, and network communication circuitry 28 that enables the machines to communicate with one another. The memory 26 includes random access memory and/or non-volatile storage, which, as understood, can together comprise a large amount of virtual memory via swapping techniques. The memory 26 may contain instantiated objects and persistent data for other objects as understood in object-oriented technology, as well as DCOM functions described below. As is known, the objects comprise methods and data encapsulated within a data structure and have certain properties such as being accessible only through specifically defined interfaces.

In DCOM, a server on a remote machine makes one or more objects available to remote client processes through a server process known as an object exporter. If the server process is a single-threaded process, the server process is the object exporter, while if the server is a multithreaded process, the object exporter may have multiple threads associated with one object exporter. In any event, each object exporter has its own object exporter identifier (OXID).

Each machine supporting DCOM (and thus COM) has an internal COM library which provides functions for creating instances of both local and remote objects. Thus, the machines 223 and 226, shown in more detail in FIG. 2 as local machine A and remote machine B, respectively, each have a respective COM library 30 and 32. To create an object 34 for a client process 36, the COM library 30 receives a CLSID (class identifier) and interface identifier (IID) from the client process 36, and accesses a database such as a system registry 38 or the like which maps an object's CLSID to a particular DLL or executable file, if local, or a particular machine, if remote. For remote objects, the system registry 38 thus includes information identifying the machine (e.g., 226) on which the remote server object 34 can be created.

More particularly, as shown in the flow diagram of FIGS. 5A–5B, to create an object, a client process 36 calls a function in the COM library 30 at step 100, such as the function CoCreateInstance( ), passing as parameters a CLSID to identify the desired class of object and an interface ID (IID) of that object. The client process 36 is generally unaware whether the object will be created locally or remotely. Alternatively, as is done with CoCreateInstanceEx( ), the client may specify the server at which the object will be run, by identifying the server as a parameter in the API call. At step 102, a local service control manager (SCM) 40 process associated with the local COM library 30 searches the system registry 38. At step 104 it is determined whether the object is remote or local, and, if local, is handled locally by step 106. Local objects (i.e., those in the same machine) are handled in a well-known manner, and thus are not discussed in detail hereinafter for purposes of simplicity.

Figure 2:
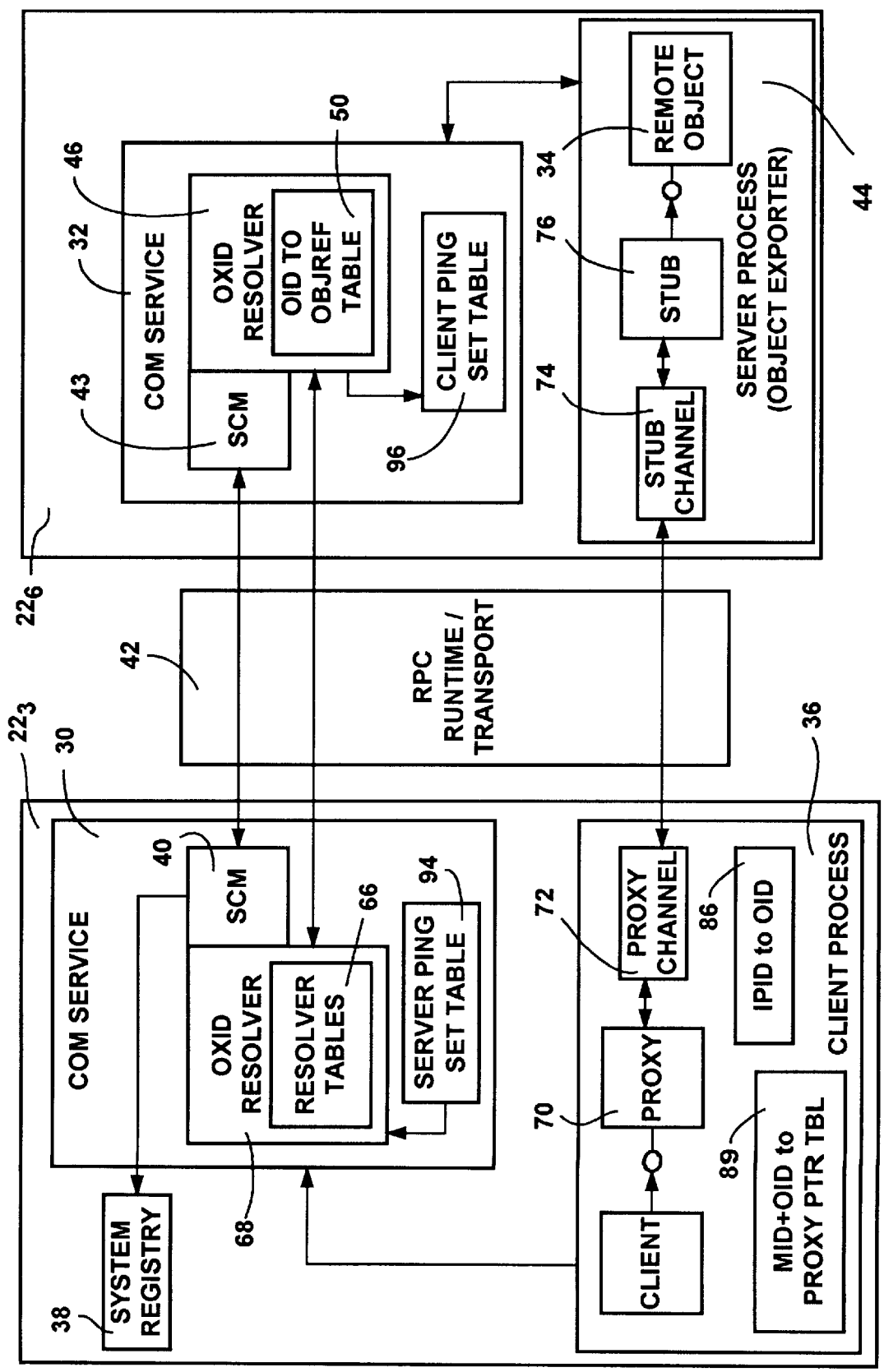
FIG. 2 is a block diagram representing DCOM components in a machine having a client process therein communicating with DCOM components in a remote machine having a server process therein.

Assuming the requested object is the remote object 34, step 104 branches to step 108 where the remote machine information (e.g. the machine name or address in accordance with a given protocol) is obtained from the local system registry 38. Using this information, at step 110 an RPC call is made via the RPC runtime/transport 42 in a known manner by the client machine's SCM 40 to a SCM 43 of the remote machine 226. In actuality, the local SCM 40 accesses the remote SCM 43 through an interface known as IActivation, passing the CLSID and IID to the remote SCM 43. If the remote object 34 can be created (based upon the passed CLSID), the remote SCM 43 instantiates the desired object 34 in a server process 44 on the machine 226. Through a remote OXID resolver 46, the remote SCM 43 at step 112 returns to the client SCM 40 an interface pointer 48 (FIG. 3), OBJREF, having reference information related to the remote object 34 therein. As shown in FIG. 2, the remote OXID resolver 46 received this information from the server process 44 which constructed an OBJREF for the object when the interface was marshaled to return to the client. It should be noted that each unique instance of a single class has a unique OBJREF, that is, OBJREF's are per instance, not per class.

Figure 3:
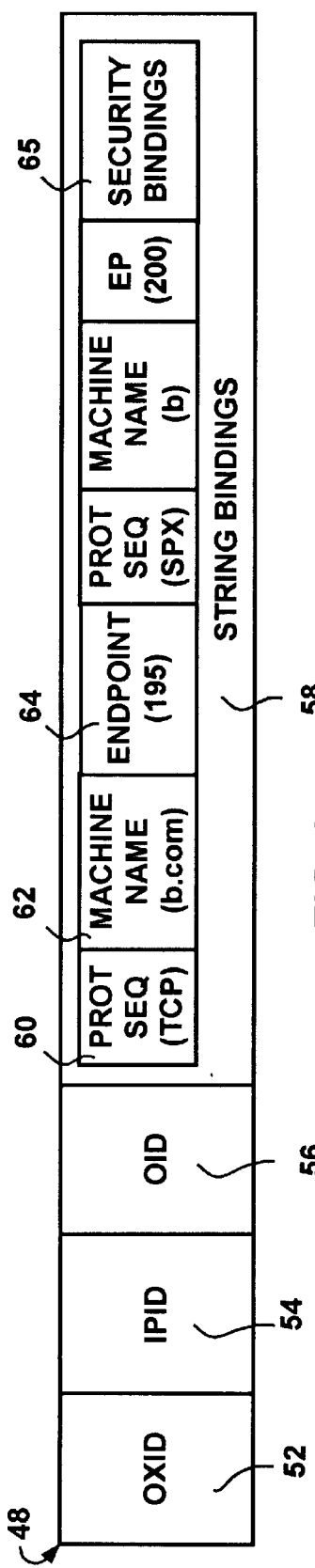
FIG. 3 is a block diagram representing an interface pointer returned from a remote machine.

OBJREF 48 is returned to the local COM library 30 via the client SCM 40 and unmarshaled at step 114 using a COM function named CoUnmarshalInterface( ). As best shown in FIG. 3, the interface pointer OBJREF 48 includes the OXID 52 of the remote server process 44, an interface pointer identifier (IPID) 54 corresponding to the passed IID, an object identifier (OID) 56 identifying the remote object 34 and a set of string bindings 58 for the remote OXID resolver 46. As is known, string bindings identify a particular process on a particular machine, and are character strings that include protocol sequence information 60, machine identity information 62, (e.g., a network address), an endpoint (or port) 64 identifying a specific process on that machine, and security information 65. It should be noted that the endpoint is optional, as a mechanism called the endpoint mapper will fill in the endpoint if not specified explicitly in the string bindings. Indeed, the resolver string bindings generally do not have an endpoint therein. In this way, the remote resolver string bindings 58 identify the remote OXID resolver process 46, and, as explained in more detail below, is cached in one of the local resolver tables 66 (FIG. 2) of a local OXID resolver 68.

However, at this time the string bindings of the remote server object exporter (e.g., server process 44) are not necessarily known locally. Note that OBJREF does not include the string bindings for the object exporter itself to save on the number of protocols that an object exporter needs to load to service a client. Instead, using this scheme, only the OXID resolvers 46 and 68 need to listen for all protocols, as a remote object exporter such as the object exporter 44 is instructed by its OXID resolver 46 to load specific protocols only when needed. Such a scheme is described in U.S. patent application Ser. No. 08/738,432, assigned to the assignee of the present invention.

The OBJREF 48 effectively provides the client process 36 with the information needed (i.e., the OXID of the server process, i.e., the object exporter 44 and the remote resolver string bindings 58) to obtain the string bindings of the remote object 34. To obtain the string bindings of the remote object exporter 44, at step 116 DCOM passes information from the returned OBJREF 48 (i.e., the OXID and resolver string bindings to the resolver) for the object 34 to the client machine's OXID resolver 68. However, as is known from U.S. Pat. No. 5,511,197, which is assigned to the assignee of the present invention and hereby incorporated by reference in its entirety, in DCOM, the mechanism to contact a remote object is essentially hidden from the client process 36 by a proxy 70 and a proxy channel 72. The client process 36 is given a pointer to the proxy 70 once the remote object 34 is resolved by the OXID resolver 68.

One feature of DCOM is that a machine may receive an unsolicited reference to a remote object, (such as shown at entry point 113 of FIG. 5A), unmarshal the object (step 116), and store information for that object in its resolver tables 66. This is desirable in that an application may wish to access a remote object without having to undergo the expense of directly obtaining the information.

While receiving such an unsolicited reference is desirable with some applications, a security problem arises in that bad information may be passed to a machine which can corrupt information stored in the tables. More particularly, a malicious machine such as the machine 225 of FIG. 1 (Machine Q) may send an unsolicited interface pointer (OBJREF) with the same OXID, IPID and OID as a valid object for machine B, but with string bindings pointing (at least in one protocol sequence) to the malicious machine's resolver instead of the resolver of the machine that properly has the object. Since this identifying information is unmarshaled and stored in the client machine, possibly in addition to the string bindings that identify the correct OXID resolver, a client object resolver seeking to resolve an OXID may call the wrong remote OXID resolver and obtain the string bindings to an incorrect object exporter.

According to one aspect of the invention, to ensure that the proper remote OXID resolver is called, each unique permutation of a remote OXID resolver's string bindings is considered by the local machine to be a separate machine. To this end, at step 120 (FIG. 5B), the string bindings in an OBJREF (identifying a remote OXID resolver) are compared by the local resolver 68 against those already known and stored in a table 80 (FIG. 4) of local machine identifiers-to-remote resolver string bindings. If no match is found, then at step 122 a unique local machine identifier (MID) is locally generated, and the MID is assigned to the new permutation of string bindings in the table 80. The MID is unique to local machine, and is not necessarily unique in the network.

Figure 4:
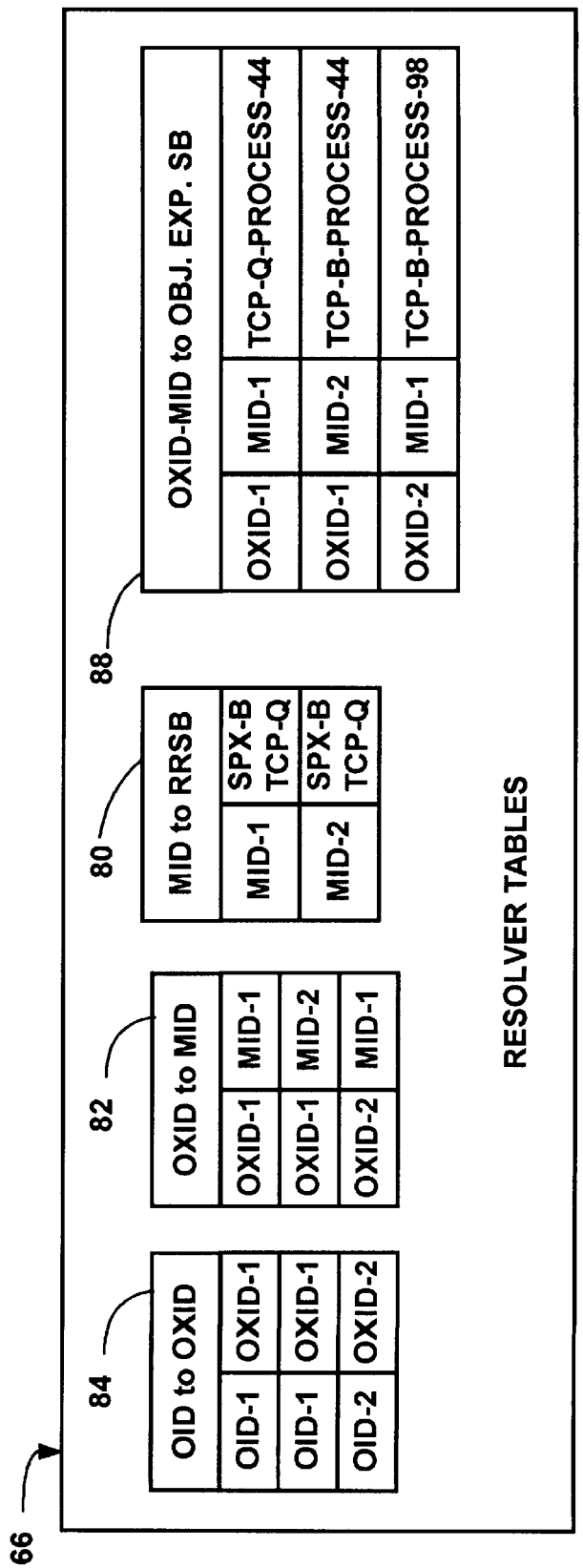
FIG. 4 represents a number of tables maintained in the machine having the client process therein.

According to another aspect of the invention, the MID is also stored in a table 82 so that the MID is mapped to the other reference information for the remote object. In other words, each remote object as referenced by its OBJREF is essentially paired with a MID so that each remote object is specifically associated with a particular machine. For simplicity, the OID and MID can be thought of as a pair, although the actual tables shown in FIG. 4 are more complex. As can be appreciated, an OID-MID pair essentially corresponds to a unique proxy, since, from the resolver tables 66, all information needed to ultimately get to a remote object can be deduced from a unique OID-MID pair.

At this time, since the resolver string bindings are considered by step 120 to be new, no string bindings for the remote object exporter 44 are locally available and thus the remote object exporter's string bindings are obtained from the remote OXID resolver 46. The process of obtaining the remote object exporter's string bindings via the remote OXID resolver 46 is described below with reference to steps 128 and 130.

Conversely, if at step 120 the remote OXID resolver's string bindings do match an entry in the table 80, then the corresponding MID is known for a particular remote OXID resolver 46, in conjunction with the other OBJREF information about the object stored in tables 82–86. In other words, the MID is already known and is retrieved at step 124. Since the remote resolver 46 has been accessed before by the client machine's resolver 68, there is a possibility that the string bindings for the remote object exporter 44 may be already known locally (such as if another client process on the local machine has recently used the same remote server process 44). If the remote object exporters's string bindings are already known locally, that information need not be obtained from the remote OXID resolver 46 via another (relatively slow) RPC communication.

Objects within the same object exporter have the same string bindings. As described in more detail below, the DCOM libraries pair the MID with the OXID to find the string bindings for the object exporter (i.e., server process 44) in which the object lives. If a match is found, the already-known string bindings for that exporter are used, while if no match is found, the remote OXID resolver is contacted to get the string bindings for the object exporter. Then, the DCOM libraries in the client process pair the MID and OID to see if a proxy already exists for the specific object, and if a proxy exists, the DCOM libraries return that object proxy.

Thus, to test if the remote object exporter's string bindings are already known, at steps 128, the MID-OXID pairing is checked by the local resolver 68 for an entry in an OXID-MID-to-remote object exporter string bindings table 88 (FIG. 4). If no corresponding entry is present, the remote OXID resolver 46 is contacted by the local OXID resolver 68 at step 130 to obtain the string bindings of the remote exporter 44. In any event, if string bindings for the remote exporter 44 are available, the MID and string bindings for the remote object exporter 44 are returned to the client process 36 at step 132.

At step 134, the client process then pairs the MID and known OID, and using the MID+OID to proxy pointer table 89 (FIG. 2) stored with the client process 36, determines if a proxy already exists for the remote object 34. If none exists, the client process 36 creates a proxy at step 136 and stores the pointer in conjunction with the MID+OID in the table 89. If a proxy exists, the client process 36 reuses the existing proxy. At this time the client process can access the remote object (actually via a stub channel 74 and stub 76), such as described in the aforementioned U.S. Pat. No. 5,511,197.

As can be appreciated, each time an interface is unmarshaled and the remote OXID resolver string bindings obtained therefrom, a string comparison is performed on the string bindings entered in the MID-to-string bindings table 80. With this mechanism, a client process 36 that requests creation of a remote object 34 will receive a proxy pointer to that object, and not one on another machine. This is assured because in order to receive a proxy pointer that already exists locally, the proxy must have the same MID (i.e., the exact string bindings) as in the OBJREF 48. Otherwise, the string bindings 48 returned in OBJREF will be used to contact the remote OXID resolver 46, and these string bindings of course identify the machine 226 where the client machine 223 requested creation of the remote object 34. Sending bad OXID resolver string bindings with an OBJREF to a client machine will not corrupt any of the client machine's resolver tables 66 since those string bindings will be assigned a different MIDs in the tables 80, 82 and 88.

Of course, if a client process wishes to use the string bindings of an object exporter that were not requested, (e.g., via CoCreateInstance), but was instead obtained in some other manner, the client risks obtaining information about an object that it may not intend to call. However, for applications dealing with objects of lesser concern, the risk may be worth taking.

Lastly, a remote object generally remains instantiated until released by the client process. However, because connections can be lost, objects will time-out if not kept alive by the client process. DCOM provides for pinging remote objects so that the client can keep remote objects alive. To this end, the client machine tracks objects which it wishes kept alive and sends information via its OXID resolver to the OXID resolver of the remote machine to ping those objects on a regular basis, e.g., at least once every two minutes (or within some other time agreed upon with a remote machine). For efficiency, a client maintains sets of server objects for remote machines in a table 94 and sends appropriate set information to each remote machine. Likewise, each remote machine maintains set information from each of its clients in a table 96. Consequently, a client need only send set change information to the remote machine (i.e., delta pinging) to keep those objects alive that it wishes to be kept alive. In this manner, DCOM thus provides an efficient and, from the perspective of a developer of server or client processes, an uncomplicated way in which to make available and use remote objects.

As can be appreciated, the pinging operation also benefits from the above-described MID-OID pairing. Without the unique MID per string bindings permutation, the wrong remote object exporter may be pinged if commonly-identified object information with bad resolver string bindings data is sent to a client machine to confuse it.

The following example is provided to summarize the operation of the invention. Assume that machine Q is a malicious machine and sends an OBJREF of [OXID-1, IPID-1, OID-1 and string bindings SPX-machine-B, TCP-machine-Q] to client machine A. As always, the information is unmarshaled and placed in the tables 80–86 shown in FIG. 4. However, according to the invention, at steps 120 and 122, a local MID of MID-1 is assigned to these string bindings. If a client process wishes to use the string bindings and/or proxy obtained therefrom (steps 128 to 136) to access a remote object, the client will receive a proxy pointer that either points to machine B if SPX is chosen as the protocol, or machine Q if TCP is chosen as the protocol. However, the client assumes this risk by using the unsolicited information obtained unsecurely.

However, if the client process 36 specifically requests an object having CLSID-1, IID-1 be created therefor, the COM library 30 contacts Machine B to create the object remotely. Machine B returns an OBJREF of [OXID-1, IPID-1, OID-1 and string bindings SPX-machine-B, TCP-machine-B] when the remote object 34 is created. In keeping with the invention, because the resolver string bindings do not exactly match any existing entry at step 120, a new MID, MID-2 is generated and assigned thereto (step 122 of FIG. 5B) as shown in FIG. 4. Note that without the MID, the process 36 would not branch to step 122 but instead ultimately receive a proxy pointing to SPX-machine-B, TCP-machine-Q. If TCP is chosen as the protocol, the wrong machine Q would be contacted.

However, because the MID is used, at step 126 the OXID value of OXID-1 is passed to the remote OXID resolver 46 using the string bindings of SPX-machine-B, TCP-machine-B. At step 132, the remote OXID resolver 46 returns (by contacting the remote resolver 46 at step 130, if necessary) the string bindings of the remote object exporter 44, herein named TCP-B-PROCESS-44 for simplicity. The string bindings are stored in the OXID-MID-to-remote object exporter string bindings table 88, and a new proxy is created therefor at step 136.

Later, if another client process requests that an object having CLSID-1, IID-1 be created therefor, the COM library 30 again contacts Machine B to create the object remotely. Machine B again returns an OBJREF of [OXID-1, IPID-2, OID-2 and string bindings SPX-machine B TCP-machine B] when the remote object 34 is created. In keeping with the invention, because the resolver string bindings exactly match an existing entry at step 120, the OXID-MID pairing [OXID-1, MID-1] is known. This time the string bindings for object exporter 44 [TCP-B-PROCESS-44] are already known locally from the OXID-MID-to-remote object exporter string bindings table 88. A proxy pointer can thus immediately be created in the new client process without having to contact the remote resolver. Note that the client process cannot be associated with a proxy that points to any other machine.

As can be seen from the foregoing detailed description, there is provided a method and mechanism that prevents incorrect information from corrupting server object information maintained by a client machine. Client processes that request creation of remote objects communicate with those remote objects on the correct machines. The mechanism and method operates in each machine without the need for a centralized authority, yet still allows unsolicited object information to be received. The method and mechanism is integrated into DCOM.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a system of distributed computer-based machines, a method of preventing object information received at a client machine from one remote machine from corrupting object information stored therein for another remote machine, comprising the steps of:

receiving object reference information from a remote machine, the object reference information including identifier information for a remote object and string bindings of a resolver process of the remote machine;

comparing the string bindings of the resolver process to a table of stored string bindings at the client machine, and if the string bindings of the resolver process do not match an entry in the table, generating a unique machine identifier at the client machine;

pairing the identifier information for the remote object with the unique machine identifier; and referencing the remote object at the client machine by the pairing of the identifier information for the remote object with the unique machine identifier.

2. The method of claim 1 wherein the object reference information includes information identifying a remote object exporter associated with the object, and wherein the remote object is referenced by pairing the identifier information for the remote object exporter with the unique machine identifier.

3. The method of claim 1 further comprising the steps of associating the unique machine identifier with the string bindings of the resolver process, and using the string bindings of the resolver process to obtain string bindings of the remote object.

4. The method of claim 1 wherein the step of referencing further includes the steps of comparing the pairing of the identifier of the remote object and the unique machine identifier to other pairings, and if the pairing of the identifier of the remote object and the unique machine identifier is distinct, providing a proxy corresponding thereto.

5. The method of claim 4 further comprising the step of using the string bindings of the resolver process to obtain string bindings of the remote object.

6. The method of claim 4 wherein if the pairing of the identifier of the remote object and the unique machine identifier is not distinct, determining an existing proxy corresponding thereto and passing a pointer to the proxy to a client process.

7. The method of claim 1 further comprising the step of creating an instance of a remote object on a remote machine.

8. The method of claim 1 wherein the object reference information includes an OXID.

9. The method of claim 1 wherein the object reference information includes an OID.

10. In a system of distributed computer-based machines, a mechanism for preventing object information received at a client machine from one remote machine from corrupting object information stored for another remote machine, comprising:

a process for receiving object reference information from a remote machine, the object reference information including identifier information for a remote object, remote object exporter, and string bindings of a resolver process of the remote machine;

a table of stored string bindings at the client machine;

means for comparing the string bindings of the resolver process to the table of stored string bindings;

means for generating a unique machine identifier at the client machine if the string bindings of the resolver process do not match an entry in the table;

means for pairing the identifier information for the remote object exporter with the unique machine identifier; means for determining if the pairing of the identifier information for the remote object exporter with the unique machine identifier is distinct, and for resolving the OXID to string bindings for the object exporter;

means for pairing the identifier information for the remote object with the unique machine identifier; and means for determining if the pairing of the identifier information for the remote object with the unique machine identifier is distinct, and creating a proxy if the pairing is distinct.

11. The mechanism of claim 10 further comprising means for using the string bindings of the resolver process to obtain string bindings of the remote object exporter.

12. The mechanism of claim 10 wherein the object reference information includes an OXID.

13. The mechanism of claim 10 wherein the object reference information includes an OID.

14. The mechanism of claim 10 further comprising means for creating an instance of a remote object on a remote machine.

15. The mechanism of claim 10 wherein the means for determining if the pairing is distinct determines that the pairing is not distinct, and further comprising means for determining an existing proxy corresponding to the pairing and passing a pointer to the proxy to a client process.

16. In a system of distributed computer-based machines, a method of preventing object information received at a client machine from one remote machine from corrupting object information stored therein for another remote machine, comprising the steps of:

receiving object reference information from a remote machine, the object reference information including identifier information for a remote object, remote object exporter, and string bindings of a resolver process of the remote machine;

comparing the string bindings of the resolver process to a table of string bindings stored at the local machine, and if the string bindings of the resolver process do not match an entry in the table, generating a unique machine identifier at the local machine;

pairing the identifier information for the remote object exporter with the unique machine identifier; and referencing the remote object exporter at the local machine by the pairing of the identifier information for the remote object exporter with the unique machine identifier.

17. A computer-readable medium having computer-executable instructions, comprising:

receiving at a local machine object reference information from a remote machine, the object reference information including identifier information for a remote object and string bindings of a resolver process of the remote machine;

comparing the string bindings of the resolver process to set of string bindings stored at the local machine, and if the string bindings of the resolver process match an entry in the table, retrieving an existing unique machine identifier associated with the string bindings at the local machine, and associating the existing unique machine identifier with the identifier information for the remote object; and if the string bindings of the resolver process do not match an entry in the table, obtaining a new unique machine identifier at the local machine, and associating the new unique machine identifier with the identifier information for the remote object.

* * * * *